(12) United States Patent
Kashihara et al.

(10) Patent No.: US 9,523,464 B2
(45) Date of Patent: Dec. 20, 2016

(54) CYLINDRICAL VIBRATION-DAMPING DEVICE EQUIPPED WITH OUTER BRACKET AND OUTER BRACKET THEREFOR

(71) Applicant: TRI TECHNICAL CENTER USA, INC., Novi, MI (US)

(72) Inventors: Hiroyuki Kashihara, Novi, MI (US); Masaaki Hamada, Novi, MI (US)

(73) Assignee: TRI TECHNICAL CENTER USA, INC., Novi ( * ) Notice: Subject to any disclaimer, the term of this patent is extended or adjusted under 35 U.S.C. 154(b) by 111 days.

(21) Appl. No.: 14/198,331

(22) Filed: Mar. 5, 2014

(65) Prior Publication Data
US 2015/0252870 A1 Sep. 10, 2015

(51) Int. Cl.
*F16F 7/00* (2006.01)
*F16M 13/02* (2006.01)
*F16F 1/38* (2006.01)

(52) U.S. Cl.
CPC ............ *F16M 13/02* (2013.01); *F16F 1/3849* (2013.01); *F16F 7/00* (2013.01)

(58) Field of Classification Search
USPC .............. 248/562, 566, 570, 580, 581, 608, 609,248/610, 611, 636; 267/136, 137, 140, 140.11, 267/141–141.5
See application file for complete search history.

(56) References Cited

U.S. PATENT DOCUMENTS

| | | | |
|---|---|---|---|
| 5,024,425 A * | 6/1991 | Schwerdt | 267/140.12 |
| 5,518,015 A * | 5/1996 | Berget et al. | 137/1 |
| 6,105,944 A | 8/2000 | David | |
| 6,585,222 B2 * | 7/2003 | Ihara et al. | 248/562 |
| 2002/0185797 A1 * | 12/2002 | Someya et al. | 267/140.11 |
| 2006/0091281 A1 * | 5/2006 | Miyahara et al. | 248/636 |
| 2010/0264569 A1 * | 10/2010 | Kojima | 267/140.11 |
| 2012/0146271 A1 * | 6/2012 | Kato et al. | 267/293 |

FOREIGN PATENT DOCUMENTS

| | | | | |
|---|---|---|---|---|
| EP | 1 852 631 A1 | 11/2007 | | |
| JP | A-11-257397 | 9/1999 | | |
| JP | B2-3490113 | 1/2004 | | |
| JP | 2004-211810 A * | 7/2004 | ............... | F16F 1/38 248/557 |
| JP | B2-3693834 | 9/2005 | | |
| JP | B2-5150374 | 2/2013 | | |

* cited by examiner

*Primary Examiner* — Alfred J Wujciak
(74) *Attorney, Agent, or Firm* — Oliff PLC

(57) ABSTRACT

A cylindrical vibration-damping device equipped with an outer bracket, the outer bracket having a structure in which a press-fit member is press fit into a peripheral wall of a bracket body. A primary inner projection is provided at one axial end of the peripheral wall, while a secondary inner projection is provided at another axial end thereof. The outer bracket also includes a positioning section that is provided through mutual contact of axially opposing surfaces of the bracket body and the press-fit member and that determines a position of the press-fit member. The press-fit member which is molded as a thick-walled molded part has a thick contact surface formed on a tip end of the press-fit member in a direction of press fitting, and the thick contact surface comes into contact with a vibration damping rubber in the axial direction.

14 Claims, 14 Drawing Sheets

CYLINDRICAL VIBRATION-DAMPING DEVICE EQUIPPED WITH OUTER BRACKET AND OUTER BRACKET THEREFOR

TECHNICAL FIELD

This invention relates to vibration damping devices and outer brackets used as automotive engine mounts, etc., and more particularly, to a cylindrical vibration damping device equipped with outer bracket that has a structure wherein the vibration damping device main unit is assembled into a mounting hole in an outer bracket, as well as the outer bracket therefor.

BACKGROUND ART

Conventionally, a cylindrical vibration-damping device equipped with outer bracket (hereinafter referred to as a "cylindrical vibration-damping device") is known as one type of vibration damping connectors or vibration damping support that is placed between the components that make up the vibration transmission system, it provides a vibration damping connection between those components, and it is applicable to automotive engine mounts, etc. The cylindrical vibration-damping device as stated in U.S. Pat. No. 6,105,944 (Patent Document 1), for example, features a structure wherein an outer bracket is attached to a vibration damping device main unit that is provided with a vibration damping rubber on the outer circumference of an inner shaft member, and the outer bracket is equipped with a mounting hole which is fixed externally onto the outer peripheral surface of the vibration damping rubber.

Incidentally, because the vibration damping rubber in Patent Document 1 is installed in the mounting hole of the outer bracket in a non-adhesive way, an inner projection that protrudes toward the inner circumference is formed at each axial end of the peripheral wall of the outer bracket that forms the mounting hole for the purpose of maintaining the position of the vibration damping rubber and preventing it from falling out of the mounting hole.

However, when you attempt to integrally form the inner projections at both axial ends of the peripheral wall of the outer bracket, a problem arises wherein removal of the mold in the axial direction becomes impossible due to the inner mold (core) that is used to form the inner peripheral surface of the peripheral wall getting caught on the inner projections during formation of the die for the peripheral wall. Thus, in order to mold an outer bracket that is equipped with an inner projection, it was necessary to use a sand mold for the inner mold and destroy and remove that inner mold after molding the outer bracket, so efficient manufacturing was difficult due to the increased number of manufacturing processes and the increased cost required.

Because the vibration damping rubber in Patent Document 1 was also positioned in the axial direction through contact with the inner projection that is formed at each axial end of the peripheral wall, it became necessary to increase the size of the outer peripheral end of the vibration damping rubber in the axial direction, so there existed the possibility that flexibility in tuning the spring characteristics would be decreased.

BACKGROUND ART DOCUMENT(S)

Patent Document(s)

[Patent Document 1] U.S. Pat. No. 6,105,944

SUMMARY OF THE INVENTION

Problems the Invention Attempts to Solve

The present invention was established in view of the above background, and the problem to be solved, along with being able to mold the outer bracket with outstanding mass-producibility, is to provide a cylindrical vibration-damping device equipped with outer bracket with a novel structure that also makes it possible to appropriately adjust the spring characteristics.

This invention also has the purpose of providing an outer bracket with a novel structure that composes a cylindrical vibration-damping device equipped with outer bracket like that mentioned above.

Means for Solving the Problem

The embodiments of this invention that were established in order to solve that problem are described hereinafter. Furthermore, the components used in each embodiment indicated below are, as much as possible, adoptable in desired combinations.

A first mode of the present invention provides a cylindrical vibration-damping device equipped with an outer bracket comprising: a vibration damping device main unit wherein a vibration damping rubber is provided on an outer circumference of an inner shaft member; and the outer bracket having a mounting hole into which the vibration damping rubber of the vibration damping device main unit is installed, wherein the outer bracket includes: a bracket body having a peripheral wall that forms the mounting hole and a primary inner projection provided at one end in an axial direction of the peripheral wall; a press-fit member that is press fit into another end of the peripheral wall of the bracket body in the axial direction and that forms a secondary inner projection; a positioning section that is composed of axially opposing surfaces of the bracket body and the press-fit member and that determines a position of and end of the press-fit member through mutual contact of the opposing surfaces; and a thick contact surface that is formed on a tip end of the press-fit member in a direction of press fitting by having the press-fit member made as a thick-walled molded part and that comes into contact with the vibration damping rubber in the axial direction.

In the cylindrical vibration-damping device with a structure according to the first mode, the primary inner projection and the secondary inner projection are respectively provided on both axial ends of the mounting hole of the outer bracket to prevent the vibration damping device main unit from falling out of the mounting hole.

And, because the outer bracket is given a split structure wherein the press-fit member that is equipped with the secondary inner projection is press fit into the bracket body that is equipped with the primary inner projection, a mounting hole with an undercut structure that has the inner projections provided on both axial ends can be easily formed. And, because the positioning section that determines the position of the end of the press-fit member is composed of the bracket body and the press-fit member being in mutual contact in the axial direction, the press-fit member can be easily press fit into the designated position on the bracket body.

Moreover, by having the thick contact surface of the press-fit member come in contact with the vibration damping rubber in the axial direction, the vibration damping rubber is positioned axially in regard to the press-fit member.

And, because the thick contact surface is formed in the direction of press fitting, even if the size of the outer peripheral end of the vibration damping rubber in the axial direction is reduced, this contact with the thick contact surface makes it possible to limit the axial displacement of the vibration damping rubber in relation to the press-fit member. Therefore, while keeping the rubber volume of the outer circumferential portion of the vibration damping rubber from becoming excessive in the axial direction and also enabling the appropriate adjustment of its spring characteristics, it also becomes possible to soften the tuning of those spring characteristics in the prizing direction in comparison with the spring characteristics in the axis-perpendicular direction.

A second mode of this invention provides the vibration damping device according to the first mode, wherein the axially opposing surfaces of the positioning section are composed of a stepped surface provided on an inner peripheral surface of the mounting hole of the bracket body and a press-fit tip surface that is formed on a tip portion of the press-fit member in the direction of press fitting and that comes into contact with the stepped surface of the bracket body.

With the second mode, because the end of the press-fit member is positioned in the bracket body by having the press-fit tip surface of the press-fit member come in contact with the stepped surface of the bracket body in the axial direction, positioning in that axial direction is possible even with a press-fit member made of a simple shape. It is also not necessary to compose the positioning section by making the press-fit member project outward in the axial direction, so its size in the axial direction can thus be reduced.

A third mode of this invention provides the vibration damping device according to the first mode, wherein an outer projection is provided protruding from an outer peripheral surface of the press-fit member at a tail end in the direction of press fitting, and the positioning section is composed of the axially opposing surfaces of the outer projection of the press-fit member and an open end surface at the open end of the mounting hole of the bracket body.

With the third mode, it is not necessary to form a stepped surface, etc., on the inner peripheral surface of the mounting hole of the bracket body, and it is possible to establish, with excellent accuracy, the position of the press-fit end of the press-fit member in relation to the bracket body through contact between the axial end surface of the peripheral wall on the bracket body and the outer projection of the press-fit member.

A fourth mode of this invention provides the vibration damping device according to the third mode, wherein a tip end portion of the press-fit member in the direction of press fitting is given substantially a same thickness as the stepped surface, and an extending inner surface that is flush with the inner peripheral surface of the mounting hole and that extends in the axial direction is formed on the press-fit member towards the tip end in the direction of press fitting from the secondary inner projection.

With the fourth mode, because the mounting hole that is attached to the outer peripheral surface of the vibration damping rubber is formed by the inner peripheral surface of the peripheral wall of the bracket body and the extending inner surface of the press-fit member, it becomes possible to increase the amount of pressure of the press-fit member on the bracket body and to ensure a strong attachment between the outer bracket and the outer peripheral surface of the vibration damping rubber.

A fifth mode of this invention provides the vibration damping device according to the first mode, wherein the primary inner projection and the secondary inner projection are pressed against both axial end surfaces of an outer circumference of the vibration damping rubber and compose an axial compressing surface that exerts pre-compression on the vibration damping rubber.

With the fifth mode, by having the mounting hole of the outer bracket attached externally onto the outer peripheral surface of the vibration damping rubber, the outer circumference of the vibration damping rubber is pre-compression in the axial direction by the primary inner projection and the secondary inner projection and the spring characteristics of the vibration damping rubber can be easily adjusted.

A sixth mode of this invention provides the vibration damping device according to the first mode, wherein the primary inner projection and the secondary inner projection are respectively arranged a designated distance away from both axial end surfaces of the vibration damping rubber at least at an inner circumferential portion thereof, and are equipped with a non-constraining part that gives a free surface.

With the sixth mode, by securing a free surface for the vibration damping rubber through an unconstrained portion of that vibration damping rubber, elastic deformation of the vibration damping rubber is easily enabled and soft spring characteristics can be achieved.

A seventh mode of this invention provides the vibration damping device according to the first mode, wherein the secondary inner projection and the inner shaft member are arranged in opposition and separated by a designated distance in an axis-perpendicular direction, and a stopper mechanism in the axis-perpendicular direction is provided through contact between the secondary inner projection and the inner shaft member.

With the seventh mode, because the stopper mechanism in the axis-perpendicular direction is achieved without the need for any special components and the amount of relative displacement between the inner shaft member and the outer bracket in the axis-perpendicular direction is limited, excessive deformation of the vibration damping rubber is prevented and improved durability is attained. Especially because the stopper mechanism in the axis-perpendicular direction is constituted using the secondary inner projection provided on the press-fit member, it is possible to easily set the stopper clearance and other characteristics by adjusting the shape and size of the press-fit member. In addition, the use of press-fit members of differing shapes and sizes makes it possible to easily obtain stopper mechanisms of different characteristics even with the same bracket body and vibration damping device main unit.

An eighth mode of this invention provides the vibration damping device according to the first mode, wherein the press-fit member is an aluminum die cast molded component.

With the eighth mode, the use of aluminum alloy die cast molding makes it easy to form a press-fit member that is equipped with secondary inner projection with a large degree of freedom in determining its shape.

A ninth mode of this invention provides the vibration damping device according to the first mode, wherein the press-fit member being an extrusion molded component made of aluminum.

With the ninth mode, the use of aluminum alloy extrusion molding means the press-fit member can be more easily and efficient produced.

A tenth mode of this invention provides an outer bracket for use in a cylindrical vibration-damping device such that the outer bracket is fixed externally onto an outer peripheral surface of a vibration damping rubber of the vibration damping device, the outer bracket comprising: a bracket body having a peripheral wall that forms a mounting hole into which the vibration damping rubber is installed, and a primary inner projection provided at one end in an axial direction of the peripheral wall; a press-fit member that is press fit into another end of the peripheral wall of the bracket body in the axial direction and that forms a secondary inner projection; a positioning section that is composed of axially opposing surfaces of the bracket body and the press-fit member and that determines a position of and end of the press-fit member through mutual contact of the opposing surfaces; and a thick contact surface that is formed on a tip end of the press-fit member in a direction of press fitting by having the press-fit member made as a thick-walled molded part and that comes into contact with the vibration damping rubber in the axial direction.

With the outer bracket used on a cylindrical vibration-damping device that is given the structure in accordance with the tenth mode, a mounting hole with an undercut structure into which the primary inner projection and the secondary inner projection protrude at the respective axial ends thereof can be easily molded by post-fixing a press-fit member that is equipped with the secondary inner projection onto the bracket body that is equipped with the primary inner projection.

And, by providing a positioning section that determines the position of the end of the press-fit member in relation to the bracket body, the press-fit member can be easily press fit up to a designated position on the bracket body.

Furthermore, because the molded, thick press-fit member is provided with a thick contact surface that, when installing it onto the vibration damping device main unit, comes in contact with the vibration damping rubber in the axial direction, the vibration damping rubber is stabilized and regulated by the contact of the thick contact surface whenever the outer bracket is attached to the outer peripheral surface of the vibration damping rubber. And, especially because the thick contact surface is formed on the end of the press-fit member in the direction of press fitting, the positioning of the vibration damping rubber and the press-fit member or the like can be effectively realized through contact with the thick contact surface, even when the size of the outer circumferential portion of the vibration damping rubber in the axial direction is small.

Effect of the Invention

With this invention, the outer bracket that is fixed externally onto the vibration damping rubber of the vibration damping device main unit is constructed of a combination of a bracket body that is equipped with primary inner projection on one end of its peripheral wall in the axial direction and a press-fit member that is formed with the secondary inner projection and is press fit into the other end of its peripheral wall in the axial direction. This way, a mounting hole with an undercut structure that is equipped with the inner projections on both sides in the axial direction can be easily and efficiently molded. And, by providing a positioning section that determines the position of the end of the press-fit member in relation to the bracket body, it is possible to easily and with excellent accuracy press fit the press-fit member up to a designated position on the bracket body. In addition, by equipping the thick, molded press-fit member with a thick contact surface and having that thick contact surface come in contact with the vibration damping rubber in the axial direction, it is possible to position the vibration damping rubber axially in relation to the press-fit member, and it is possible to attached the mounting hole of the outer bracket to the outer peripheral surface of the vibration damping rubber at a designated position in the axial direction.

EMBODIMENTS FOR CARRYING OUT THE INVENTION

The following describes embodiments of this invention with reference to the drawings.

Figure 1:
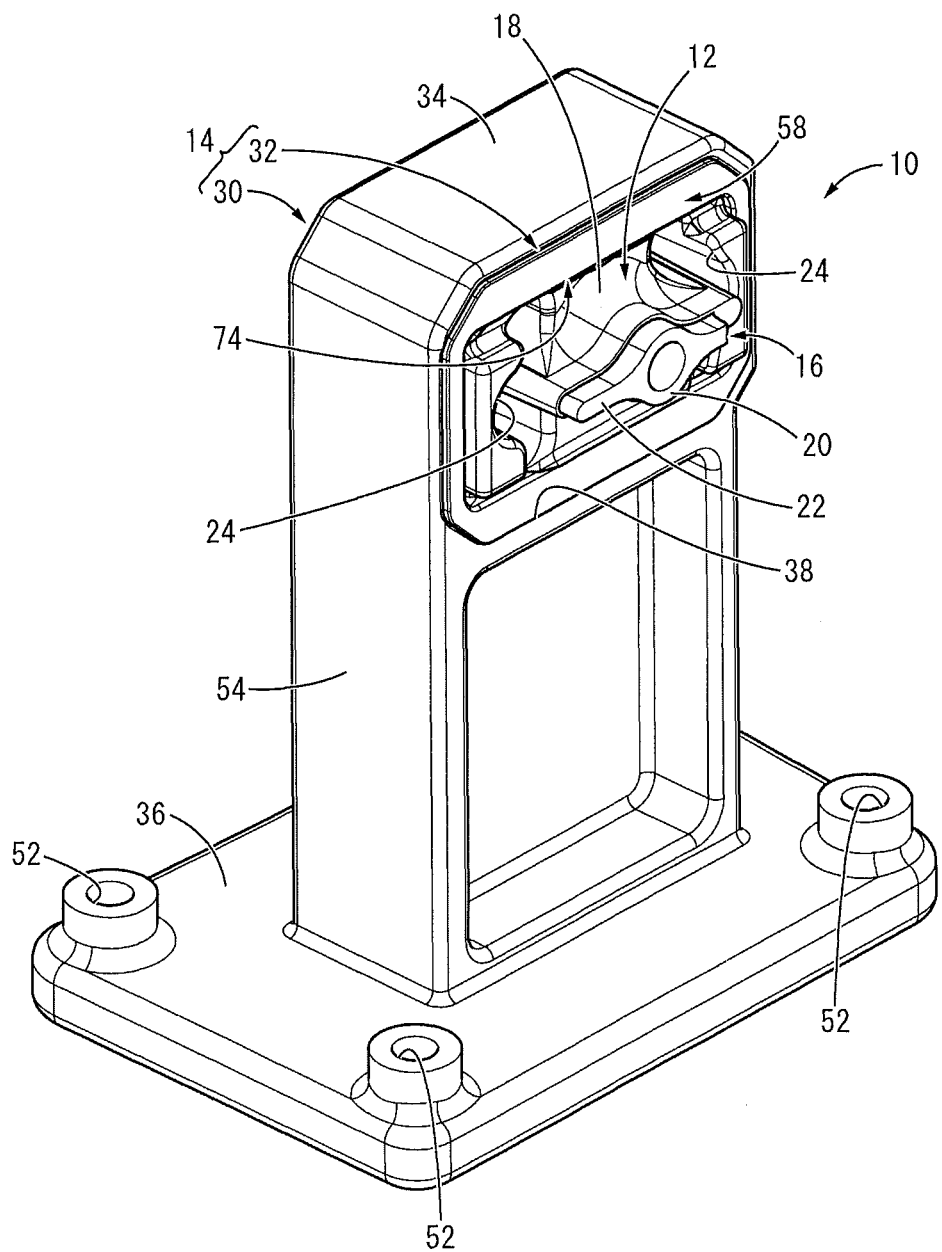
FIG. 1 is a perspective view of an engine mount as a first embodiment of this invention.
Figure 2:
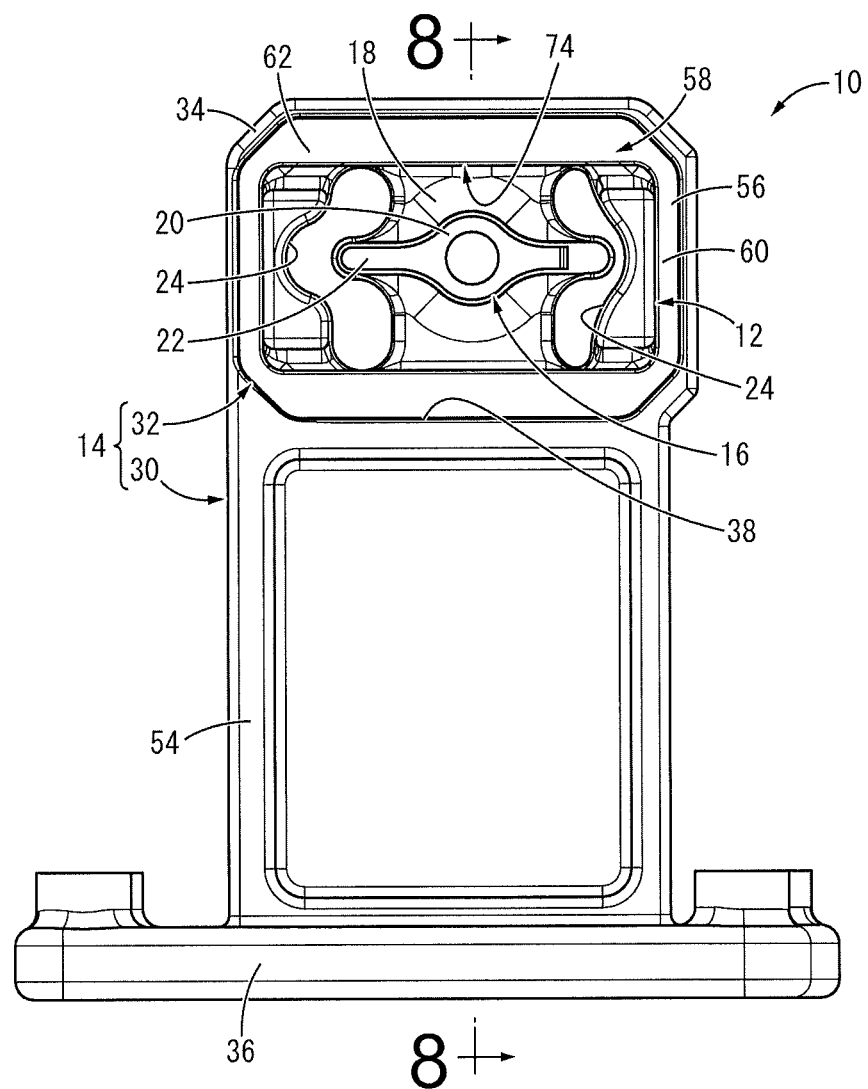
FIG. 2 is a front view of the engine mount shown in FIG. 1.

As the first embodiment of a cylindrical vibration-damping device equipped with outer bracket that has been given a structure in accordance with this invention, FIGS. 1 and 2 show an automobile engine mount 10. The engine mount 10 has a structure wherein an outer bracket 14 is attached to a mount body 12 as a vibration damping device main unit. In the following explanation, the "vertical direction" in principle refers to the up-down direction in FIG. 2.

Figure 3:
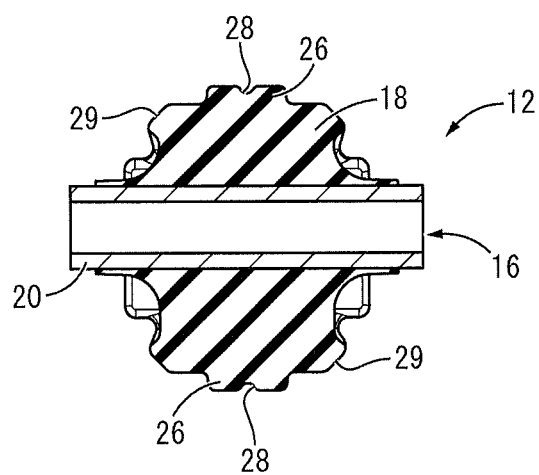
FIG. 3 is a longitudinal cross-sectional view of a mount body that composes the engine mount shown in FIG. 2.

In more detail, the mount body 12 has, as shown in FIG. 3, a structure in which a vibration damping rubber 18 is provided on the outer circumference of an inner shaft member 16. The inner shaft member 16 is a rigid component made of metal or synthetic resin, etc., and is integrally formed of a cylindrical member 20 that has a small diameter and a substantially cylindrical shape and a projecting plate 22, which extends in a radial direction (to the left and right as shown in FIG. 2) from both external sides of the cylindrical member 20. The projecting plate 22 has a board shape that extends substantially at right angles to the vertical direction, and projects from the vertically central portion, of the cylindrical member 20.

The vibration damping rubber 18 is given a thick, substantially polygonal cylindrical shape overall, and its inner peripheral surface is adhered to the outer peripheral surface of the inner shaft member 16 through vulcanized adhesion and is thus formed as an integrally vulcanized molded component that is equipped with the inner shaft member 16. Moreover, a set of through-holes 24, which penetrate through in the axial direction and extend in the circumferential direction, is formed in the vibration damping rubber 18 and is positioned in opposing locations, on the left and right sides of the inner shaft member 16. Furthermore, on the outer periphery of the axially central portion of the vibration damping rubber 18, a contact protrusion 26 is continuously formed all around the circumference, and a groove 28 is formed opening toward the outer peripheral surface of the contact protrusion 26 and extending in a circumferential loop. Furthermore, bevel 29 is formed on both axial ends of the outer circumferential portion of the vibration damping rubber 18, which becomes gradually smaller outward in the axial direction. The left and right outer portions of the vibration damping rubber 18 that sandwich the set of through-holes 24 protrude outward in the axial direction and ensure a large opposing surface area in the left and right direction in relation to the inner shaft member 16.

Figure 4:
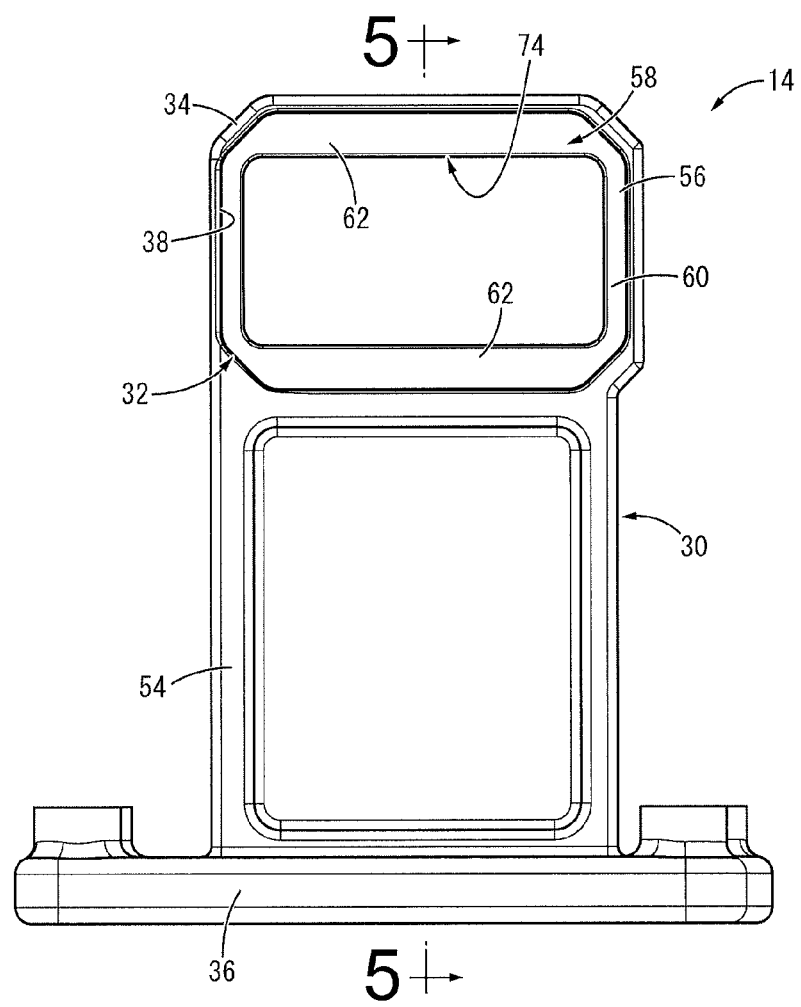
FIG. 4 is a front view of an outer bracket that composes the engine mount shown in FIG. 2.
Figure 5:
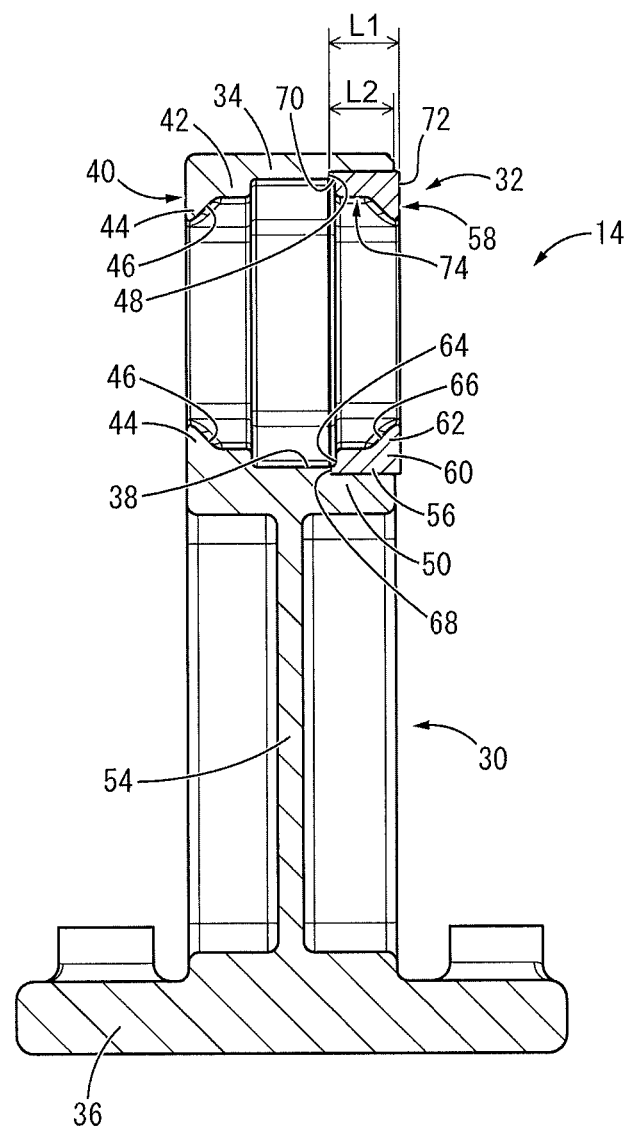
FIG. 5 is a cross-sectional view taken along line 5-5 of FIG. 4.

The outer bracket 14 is attached to the mount body 12. As shown in FIGS. 4 and 5, the outer bracket 14 has a structure wherein a press-fit member 32 is press fit into a bracket body 30.

Figure 6:
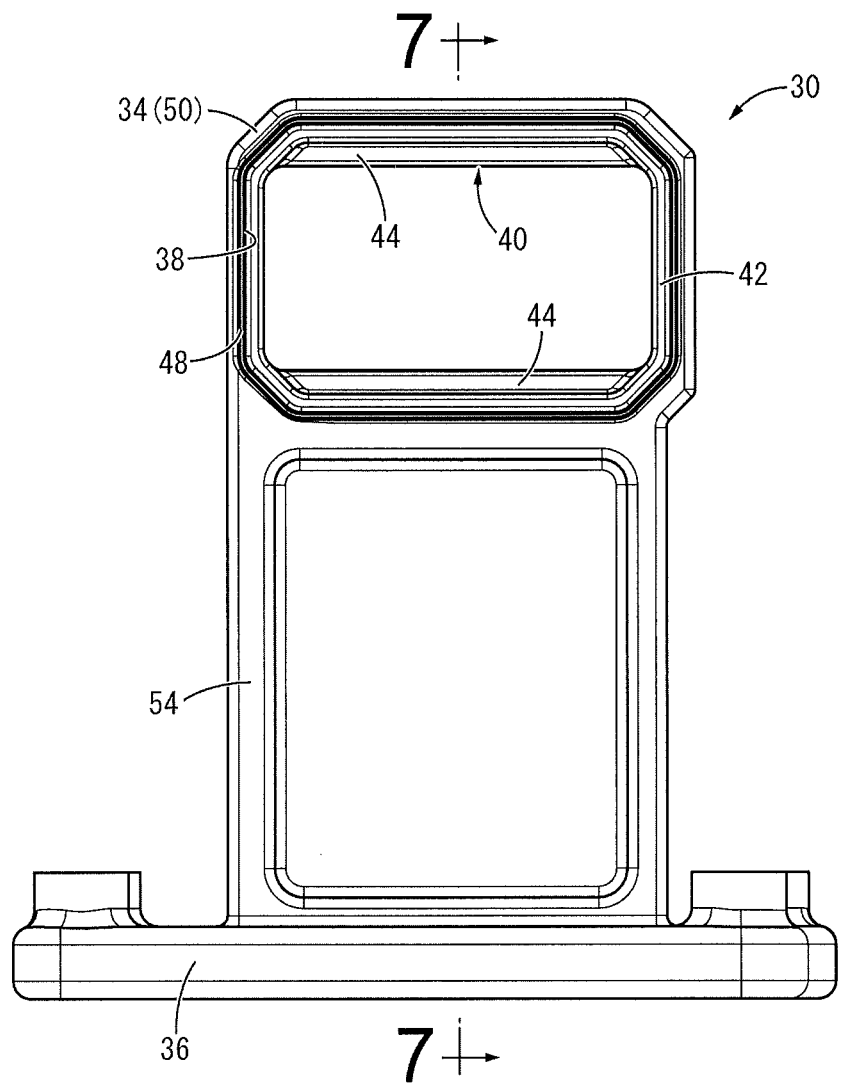
FIG. 6 is a front view of a bracket body that composes the outer bracket shown in FIG. 4.
Figure 7:
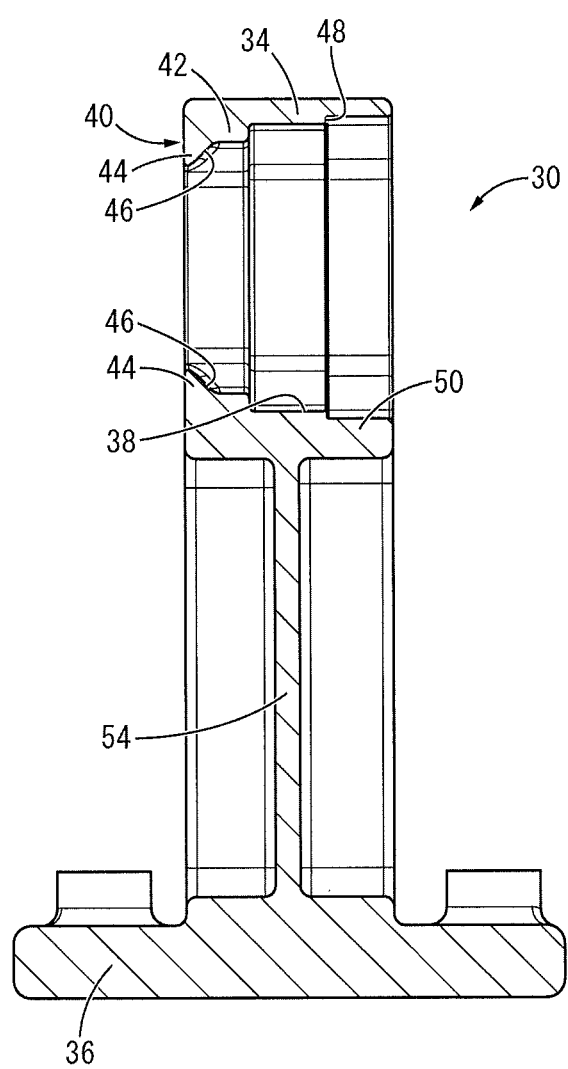
FIG. 7 is a cross-sectional view taken along line 7-7 of FIG. 6.

The bracket body 30 is a highly rigid component formed by metal, aluminum alloy or fiber-reinforced synthetic resin, etc., and, as shown in FIGS. 6 and 7, it is equipped with a substantially polygonal, a cylindrical-shaped peripheral wall 34 and with an attachment 36 that is integrally formed with the peripheral wall 34.

An inner hole 38 is formed in the peripheral wall 34 and penetrates through the center in the axial direction. A primary inner projection 40 is integrally formed on one end of the inner hole 38 in the axial direction. The primary inner projection 40 protrude to the inner circumferential side on one end of the axial direction of the peripheral wall 34 and they are integrally equipped with a primary base 42, which extends all around the circumference, and a pair of upper and lower tips 44 that protrude into the inner hole 38 on one end of the axial direction of the primary base 42. The primary base 42 is provided over approximately ⅓ of the peripheral wall 34 from one end in the axial direction and it extends in a substantially regular cross-sectional shape in the axial direction of the peripheral wall 34. While the surface of one side of primary tips 44 in the axial direction of the peripheral wall 34 extends substantially perpendicular to that axial direction, the surface of the other side in the axial direction is provided with a primary tapered surface 46, which slopes to one side in the axial direction toward the projecting tip, thus becoming gradually thinner toward its protruding tip in the axial direction of the peripheral wall 34.

A stepped surface 48, which extends in the substantially axis-perpendicular direction, is formed continuously on the peripheral wall 34, all around the circumference of the inner peripheral surface of the inner hole 38, and the other end in the axial direction further than the stepped surface 48 on the peripheral wall 34 serves as a press-fit section 50, whose inside diameter is larger than that of one end in the axial direction.

The attachment 36 is given a substantially square, board shape in which bolt holes 52 that penetrate through vertically on the respective corners are formed. This attachment 36 is arranged separately below the peripheral wall 34 and is integrally connected to the peripheral wall 34 by a vertically-extending connecting member 54. The connecting member 54 is integrally formed with the peripheral wall 34 and the attachment 36 and, while being given a board shape that extends in the direction substantially orthogonal to the axial direction of the peripheral wall 34, while its outer circumferential edge protrudes in both sides in the thickness direction to give it a substantially rectangular cylindrical shape that extends in the axial direction of the peripheral wall 34.

With this type of structure, the bracket body 30 is a thick-walled molded part that is made, for example, as an aluminum alloy die cast molded component. Here, while the outer peripheral surface of the peripheral wall 34 of the bracket body 30 has a substantially fixed shape extending in the axial direction, because the inner peripheral surface of the inner hole 38 has a diameter that increases from one direction to the other, it is possible to form that inner peripheral surface and the outer peripheral surface using a metal mold that is split in the axial direction.

On the other hand, the press-fit member 32 is equipped with an annular-shaped outer circumferential press-fit section 56 that is equipped with an outer peripheral surface that substantially corresponds to the inner peripheral surface of the press-fit section 50 on the bracket body 30 and is an aluminum alloy die cast thick-walled molded part. The press-fit member 32 is also equipped with a secondary inner projection 58 that protrudes from the outer circumferential press-fit section 56 toward its inner circumference, and the secondary inner projection 58 is integrally equipped with a secondary base 60, which extends in a peripheral loop, and a pair of upper and lower secondary tips 62 that protrude on the inner circumferential side of the secondary base 60.

While the secondary base 60 extends with a substantially regular cross-sectional shape over substantially the full length of the press-fit member 32 in the axial direction, the surface of its end in one axial direction serves as a thick contact surface 64. The thick contact surface 64 is formed toward one side in the axial direction from the middle of the axial direction of the press-fit member 32 (the direction of press fitting into the peripheral wall 34), and is ideally formed with a thickness that is ⅓ or less of the axial length of the press-fit member 32.

The secondary tips 62 protrude both upward and downward from the other end in the axial direction of the secondary base 60. While the surface of one side in the axial direction serves as a secondary tapered surface 66 that gradually slopes toward the other side in the axial direction and the protruding tip, the surface of the other side in the axial direction extends substantially perpendicular to that axial direction, thus becoming gradually thinner toward its protruding tip in the axial direction of the press-fit member 32.

Further, with the press-fit member 32 of this embodiment, the outer circumferential press-fit section 56 has a tip portion that protrudes towards the tip end in the direction of press fitting further than the side surface of the secondary base 60, and a press-fit tip surface 68 of the outer circumferential press-fit section 56 is arranged on the tip end side in the direction of press fitting from the side surface of the secondary base 60. The press-fit tip surface 68 of the outer circumferential press-fit section 56 is given the substantially same dimension in the axis-perpendicular direction as the stepped surface 48, and the inner peripheral surface of the tip portion in the direction of press fitting serves as an extending inner surface 70 that extends in the axial direction, which is flush with the inner peripheral surface of the inner hole 38, and is provided towards the tip end in the direction of press fitting from the secondary inner projection 58 of the press-fit member 32. The thickness of the tip portion of the press-fit member 32 in the direction of press fitting is substantially the same as that of the stepped surface 48 in the axis-perpendicular direction. Here, the thickness of the tip portion of the press-fit member 32 in the direction of press fitting being substantially the same as the stepped surface 48 does not necessarily mean that the thickness of the entire tip portion in the direction of press fitting must be the same as the stepped surface 48, but it will suffice that the thickness of the tip portion in the direction of press fitting is substantially the same as the stepped surface 48 at the tip end in the direction of press fitting.

With this type of structure, the press-fit member 32 is a thick-walled molded part that is made, for example, as an aluminum alloy die cast molded component. Here, while the outer peripheral surface of the press-fit member 32 has a substantially fixed shape extending in the axial direction, because its inner peripheral surface becomes smaller from one end to the other, it is possible to form the inner peripheral surface and the outer peripheral surface using a metal mold that is split in the axial direction.

The outer bracket 14 is also composed by the press-fit member 32 being fixed to the peripheral wall 34 of the bracket body 30. In other words, while the press-fit member 32 is press fit into the press-fit section 50 from the other end in the axial direction of the peripheral wall 34, the positioning section that determines the position of the end of the press-fit member 32 in the axial direction is composed by having the press-fit tip surface 68 of the press-fit member 32 and the axial end surface of the press-fit section 50 (stepped surface 48) in mutual contact in the axial direction. As is clear from the above, the axially opposing surfaces of the bracket body 30 and the press-fit member 32, which form the positioning section, are composed by the stepped surface 48 of the bracket body 30 and the press-fit tip surface 68 of the press-fit member 32.

With this embodiment, because the length (L1) of the press-fit member 32 in the axial direction is made longer than the length (L2) of the press-fit section 50 of the inner hole 38 in the axial direction, when the press-fit tip surface 68 of the press-fit member 32 is in contact with the stepped surface 48 of the press-fit section 50, a press-fit tail end surface 72 of the press-fit member 32 protrudes outward in the axial direction in relation to the axial end surface of the peripheral wall 34. This way, even if there is an error in the axial size of the bracket body 30 and the press-fit member 32, the press-fit member 32 can be press fit up to the designated axial position in the bracket body 30 by using a jig to press in the press-fit tail end surface 72.

Also, by attaching the press-fit member 32 onto the bracket body 30, the inner hole 38 of the bracket body 30 and the inner hole of the press-fit member 32 together serve to form a mounting hole 74. While the primary inner projection 40 is provided at one end of the mounting hole 74 in the axial direction, the secondary inner projection 58 is provided on the other end of the mounting hole 74 in the axial direction, and those primary and secondary inner projections, 40 and 58, protrude into the mounting hole 74. Furthermore, the thick contact surface 64 of the press-fit member 32 is positioned in opposition to the other axial end surface of the primary base 42 of the primary inner projection 40 at a designated distance in the axial direction. Thus, the mounting hole 74 is given a large diameter between the primary inner projection 40 and the secondary inner projection 58 and, in this embodiment, the primary inner projection 40 and the secondary inner projection 58 are given substantially symmetrical forms to their surfaces that extend in the axis-perpendicular direction.

In this way, the outer bracket 14 is constructed of the mutual combination of the bracket body 30 and the press-fit member 32, which are formed mutually independently. And, while the primary inner projection 40 is formed on the bracket body 30, the secondary inner projection 58 is formed on the press-fit member 32. Thereby, these primary and secondary inner projections, 40 and 58, are provided as protrusions at both axial ends, thus enabling the mounting hole 74, with its undercut structure wherein the center portion in the axial direction is given a large diameter, to be formed with a metal mold and without needing to use a sand mold. It therefore becomes possible to efficiently manufacture and easily mass-produce the outer bracket 14 with an undercut structure.

Furthermore, when the press-fit member 32 is press fit into the peripheral wall 34 of the bracket body 30, the press-fit end of the press-fit member 32 is positioned against the peripheral wall 34 through the contact between the press-fit tip surface 68 of the press-fit member 32 and the stepped surface 48 that is formed on the inner peripheral surface of the peripheral wall 34. Thus, with a structure wherein the bracket body 30 and the press-fit member 32 are formed independently and then press-fit, the bracket body 30 and the press-fit member 32 can be easily attached in a designated relative position and assembly work can be easily accomplished while preventing any variance in structure due to a slippage in positioning during assembly.

Figure 8:
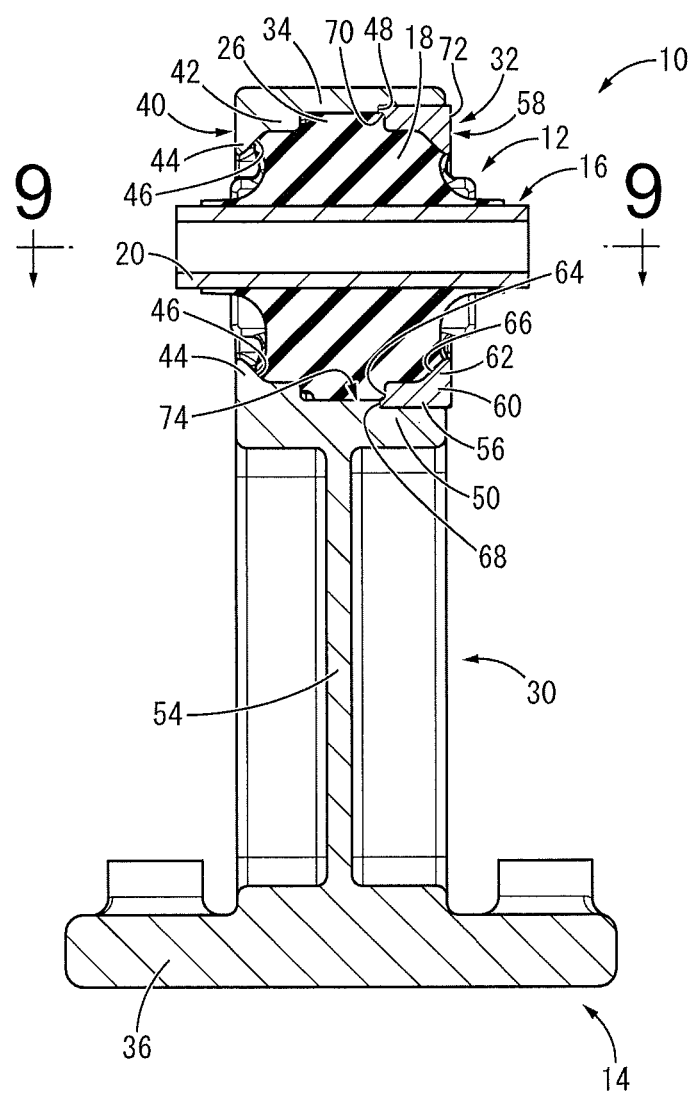
FIG. 8 is a cross-sectional view taken along line 8-8 of FIG. 2.
Figure 9:
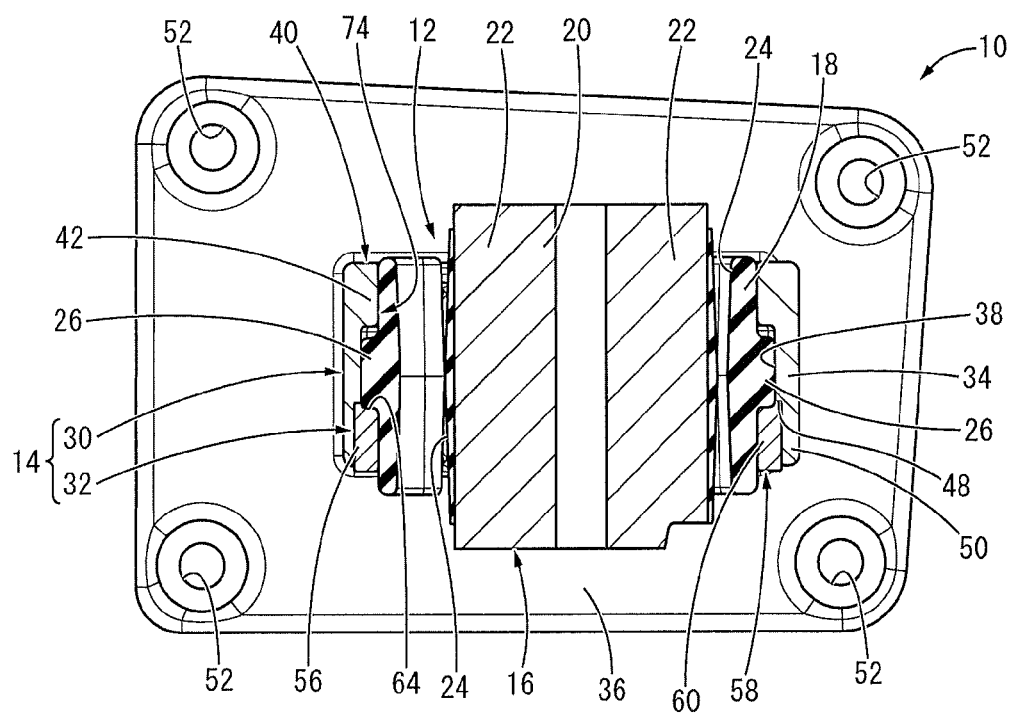
FIG. 9 is a cross-sectional view taken along line 9-9 of FIG. 8.

With this type of structure, the outer bracket 14 is attached to the mount body 12 as shown in FIGS. 8 and 9, thus forming the engine mount 10 in this embodiment. In other words, by inserting the vibration damping rubber 18 of the mount body 12 into the mounting hole 74, the peripheral wall 34 of the outer bracket 14 is fitted externally onto the mount body 12 in a non-adhesive way. The engine mount 10 is then installed on the vehicle by attaching the inner shaft member 16 to the power unit (not illustrated) and mounting the attachment 36 of the outer bracket 14 onto the vehicle's body (not illustrated), and vibration damping of the power unit is thus supported in relation to the vehicle's body.

Ideally, the assembly of the outer bracket 14 onto the mount body 12 is achieved by press fitting the press-fit member 32 into the bracket body 30 to form the outer bracket 14, then pushing the mount body 12 into the mounting hole 74 of the outer bracket 14 while elastically deforming the vibration damping rubber 18 of the mount body 12 to pass over the secondary inner projection 58. In this way, by fitting together the mount body 12 and the outer bracket 14 together only after assembling the outer bracket 14, it prevents the vibration damping rubber 18 of the mount body 12 from being sandwiched between the stepped surface 48 of the bracket body 30 and the press-fit tip surface 68 of the press-fit member 32, and it avoids damage to the vibration damping rubber 18 and any slippage in the positioning of the press-fit end of the press-fit member 32, etc. Naturally, it is also possible to install the outer bracket 14 onto the mount body 12 by press fitting the press-fit member 32 into the bracket body 30 after inserting the mount body 12 in the bracket body 30.

Also, as the vertical size of the vibration damping rubber 18 itself is made larger than the inner measurement of the mounting hole 74, the vibration damping rubber 18 is pre-compressed vertically by installation into the outer bracket 14. With this embodiment, since the left-right size of the vibration damping rubber 18 itself is made substantially the same as the left-right inner measurement of the mounting hole 74, by pre-compressing the vibration damping rubber 18 in the vertical direction to expand it to the left and right, the outer left and right surfaces of the vibration damping rubber 18 is pressed against the left and right inner surfaces of the mounting hole 74. And, because the outer vertical surface of the vibration damping rubber 18 is pressed against the inner vertical surface of the mounting hole 74 over substantially all of the axial direction, the vibration damping rubber 18 is thus pre-compressed in the vertical direction over substantially all of its axial direction.

Also, the mount body 12 is positioned in the axial direction of the outer bracket 14 by the thick contact surface 64 of the press-fit member 32 coming in contact with the axial end surface of the contact protrusion 26 of the vibration damping rubber 18. And, because the thick contact surface 64 is formed on the press-fit member 32 in the direction of press fitting, the positioning of the mount body 12 and the outer bracket 14 in the axial direction is achieved even when the contact protrusion 26 is small in size in the axial direction. And in FIGS. 8 and 9, while the contact protrusion 26 of the vibration damping rubber 18 is separated in the axial direction from the side surface of the primary base 42 of the vibration damping rubber 18, the mount body 12 may be situated more to one side in the axial direction with respect to the peripheral wall 34, and the contact protrusion 26 may be sandwiched between the axially opposing surfaces of the thick contact surface 64 and the side surface of the primary base 42.

Furthermore, with this embodiment, the primary and secondary tapered surfaces, 46 and 66, of the primary and secondary tips, 44 and 62, of the primary and secondary inner projections, 40 and 58, respectively, are pressed against the bevel 29, which is provided on the outer circumferential portion of the vibration damping rubber 18, from both axial ends, thus exerting pre-compression on the vibration damping rubber 18 in the axial direction and the axis-perpendicular direction (vertical direction). This way, the spring characteristics of the vibration damping rubber 18 are adjusted by installing the outer bracket 14 onto the mount body 12, and the targeted damping performance and durability can be realized. With this embodiment, the axial compressing surface that exerts pre-compression on the vibration damping rubber 18 is composed by the primary and secondary tapered surfaces, 46 and 66, of the primary and secondary tips, 44 and 62, respectively.

And, because the press-fit member 32 is a die cast molded part, the shape of the press-fit member 32 can be set with a large degree of freedom according to the required spring characteristics. For example, if the shape of the inner peripheral surface that is equipped with the press-fit member 32, which is equipped with the secondary inner projection 58, is made to substantially correspond to the inner peripheral surface of one axial end of the peripheral wall 34 that is equipped with the primary inner projection 40, it is possible to make the spring characteristics of the vibration damping rubber 18 substantially the same on both sides in the axial direction. A good balance in the relative displacement of the inner shaft member 16 and the outer bracket 14 is thus generated in response to input in the axial direction, the vertical direction, and the prizing direction, and stable damping performance is demonstrated.

The press-fit tip surface 68 of the press-fit member 32 is given the substantially same size as the stepped surface 48 of the bracket body 30 in the axis-perpendicular direction, and the extending inner surface 70 of the press-fit member 32 connects with and is substantially flush to the inner peripheral surface of the peripheral wall 34 of the bracket body 30 and extends in the axial direction. Through this, a sufficient press-fitting length in relation to the bracket body 30 is secured for the press-fit member 32 so as to establish a large press-fitting strength and it is possible to establish a large attachment area on the outer bracket 14 in relation to the outer peripheral surface of the vibration damping rubber 18, thus securing the positioning of the mount body 12 and the outer bracket 14 and a level of freedom in tuning the damping characteristics.

Figure 10:
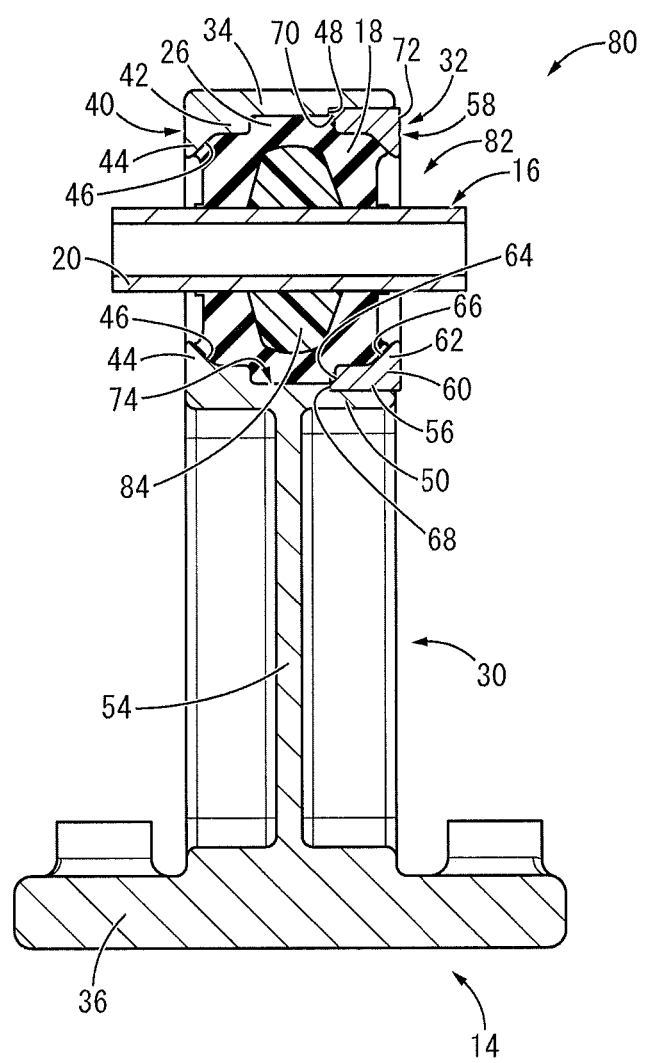
FIG. 10 is a longitudinal cross-sectional view of an engine mount as another embodiment of this invention.

Like an engine mount 80 shown in FIG. 10, a mount body 82 with a structure wherein a stopper member 84 is attached to the outer peripheral surface of the inner shaft member 16 may be adopted. In other words, according to the mount body 82, by installing the rigid stopper member 84, which protrudes vertically in relation to the inner shaft member 16, inside the vibration damping rubber 18, it is possible to adjust to a hard spring in the axis-perpendicular direction harder while maintaining the soft spring of the vibration damping rubber 18 in the prizing direction. Further, the protruding tip of the stopper member 84 is inserted axially between the primary inner projection 40 and the secondary inner projection 58 for a harder adjustment of the spring of the vibration damping rubber 18 in the axial direction. An axial stopper mechanism that limits the amount of relative displacement between the inner shaft member 16 and the outer bracket 14 in the axial direction is also provided through the contact between the primary and secondary inner projections, 40 and 58, and the stopper member 84 via the vibration damping rubber 18.

This type of mount body 82 is attached to the outer bracket 14 before the press-fit member 32 is attached to the bracket body 30. This way, by giving the outer bracket 14 a split structure wherein the press-fit member 32, which is equipped with the secondary inner projection 58, is post-fixed to the bracket body 30, which is equipped with the primary inner projection 40, it becomes possible to insert the rigid stopper member 84 axially between the primary and secondary inner projections, 40 and 58, to adjust the axial direction spring and create a stopper mechanism in the axial direction.

Figure 11:
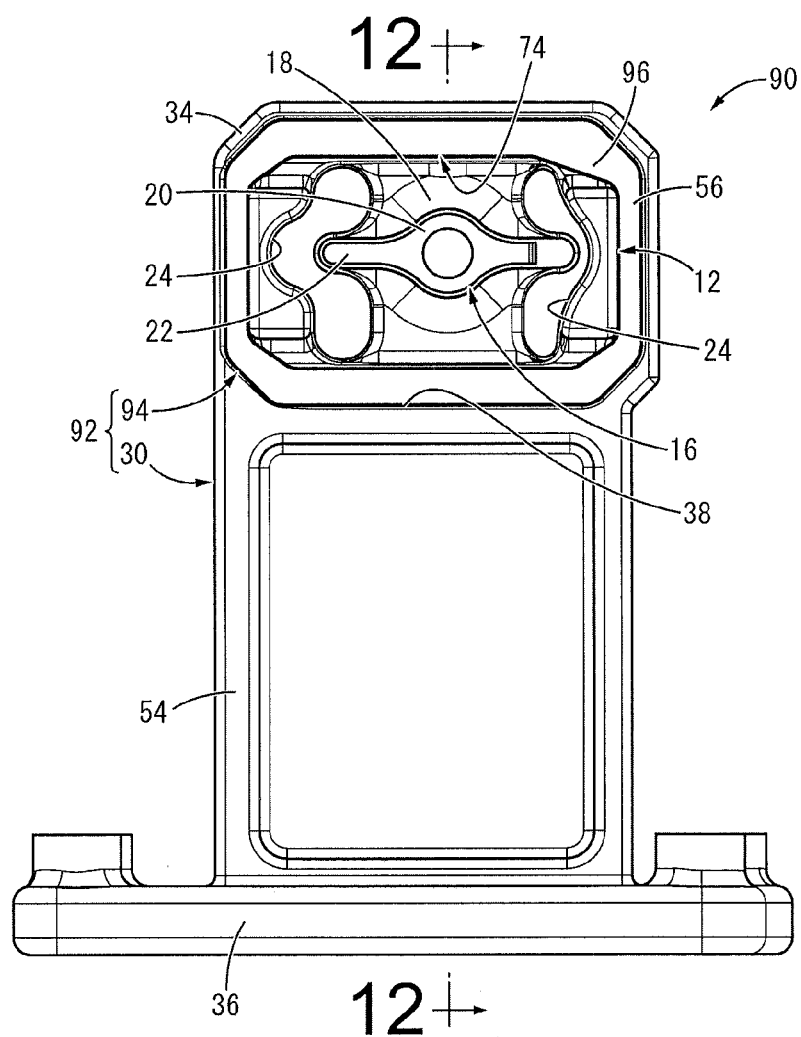
FIG. 11 is a front view of an engine mount as a second embodiment of this invention.
Figure 12:
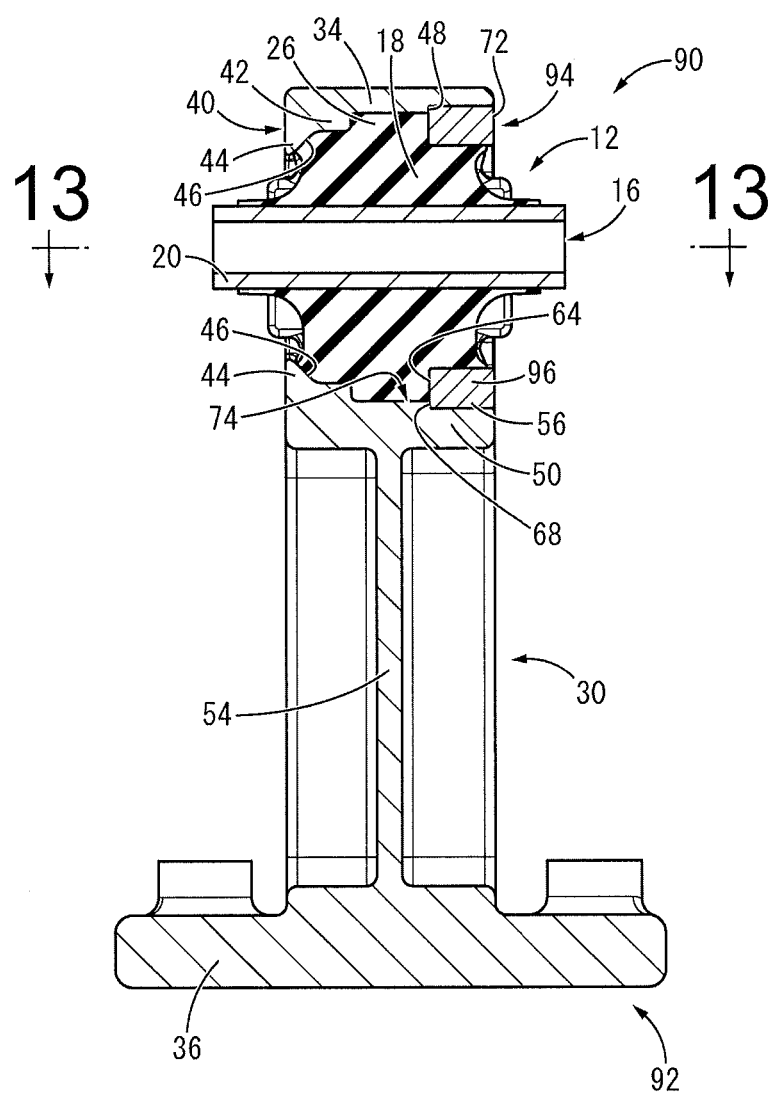
FIG. 12 is a cross-sectional view taken along line 12-12 of FIG. 11.
Figure 13:
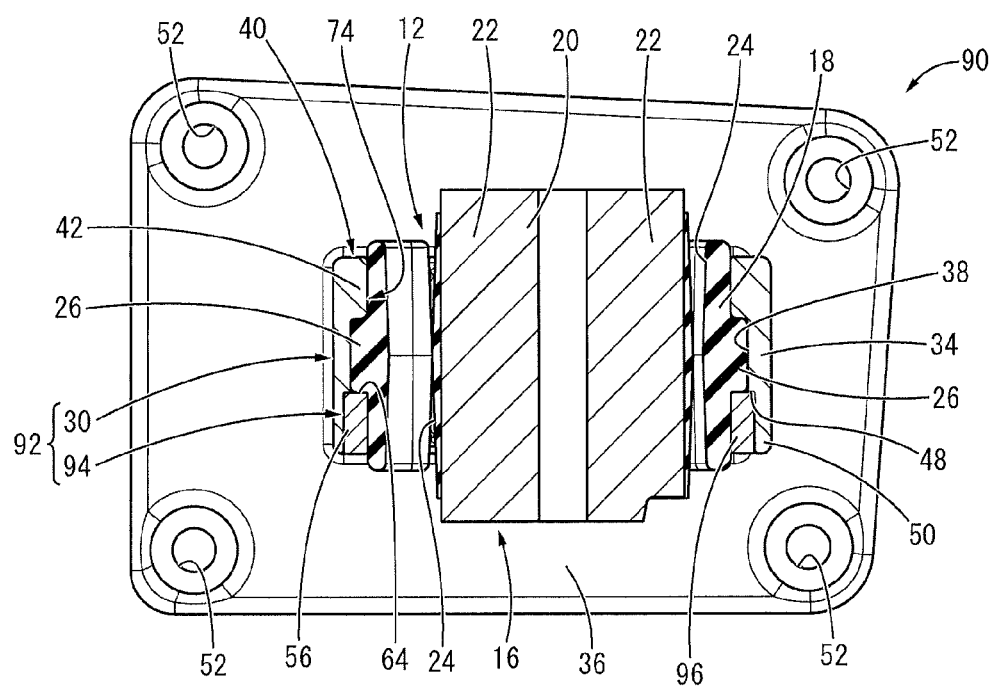
FIG. 13 is a cross-sectional view taken along line 13-13 of FIG. 12.

An automotive engine mount 90 is shown in FIGS. 11 to 13 as the second embodiment of this invention. The engine mount 90 has a structure wherein an outer bracket 92 is installed on the mount body 12. In the following embodiment, for those components and positions that are essentially the same as the first embodiment, the same numbering has been used in the diagram and separate explanations have been omitted.

In more detail, the outer bracket 92 is given a structure wherein a press-fit member 94 is press fit into the bracket body 30. The press-fit member 94 is a rigid component with a substantially polygonal cylindrical shape, and it) outer peripheral surface is formed to substantially correspond to the inner peripheral surface of the press-fit section 50 of the bracket body 30. The press-fit member 94 in this embodiment also extends in a substantially regular cross-sectional shape in the axial direction, and is an extrusion molded component made of an aluminum alloy, etc.

The press-fit member 94 is also press-fit into the peripheral wall 34 of the bracket body 30 from the other side of the axial direction, and fixed to the press-fit section 50 of the peripheral wall 34. While the surface of one end of the press-fit member 94 in the axial direction is positioned as the tip in the direction of press fitting and is placed in contact with the stepped surface 48 on the outer circumferential portion of the press-fit section 50, it is also made to contact, in the axial direction, the contact protrusion 26 of the vibration damping rubber 18 on its inner circumferential portion. As is clear from the above, while the surface of one end of the press-fit member 94 in the axial direction composes the press-fit tip surface on its outer circumferential portion, it composes a thick contact surface on its inner circumferential portion.

Furthermore, the inner circumferential portion of the press-fit member 94, which is press fit into the bracket body 30, protrudes all around the circumference further into the inner circumference than the stepped surface 48, and the inner circumferential portion serves as a secondary inner projection 96 that protrudes into the mounting hole 74. The secondary inner projection 96 in this embodiment is provided over the entire length of the press-fit member 94 in the axial direction, and is formed with a substantially constant protruding height in the axial direction. And, as shown in FIGS. 12 and 13, the protruding dimensions of the portions of the secondary inner projection 96 provided at the top and bottom of the press-fit member 94 are larger than those of the portions provided on the left and right thereof. In this embodiment, the left and right portions of the secondary inner projection 96 are given the substantially same protruding dimension as the primary base 42 of the primary inner projection 40.

Also, with the engine mount 90 in this embodiment, the other end of the vibration damping rubber 18 in the axial direction is compressed in the vertical direction by the press-fit member 94. The top and bottom portions of the press-fit member 94 are made thicker in the axis-perpendicular direction in comparison to its left and right portions (see FIG. 11).

Even with this type of engine mount 90 in relation to this type of embodiment, the outer bracket 92, a molded part that is equipped with the mounting hole 74 and its undercut structure, can be easily formed without using any special mold and with a high degree of mass-producibility.

Also, because the press-fit member 94 is given a shape that extends in the axial direction with a substantially regular cross-section, by making the press-fit member 94 an extrusion molded part, it can be formed more easily and at lower cost.

Figure 14:
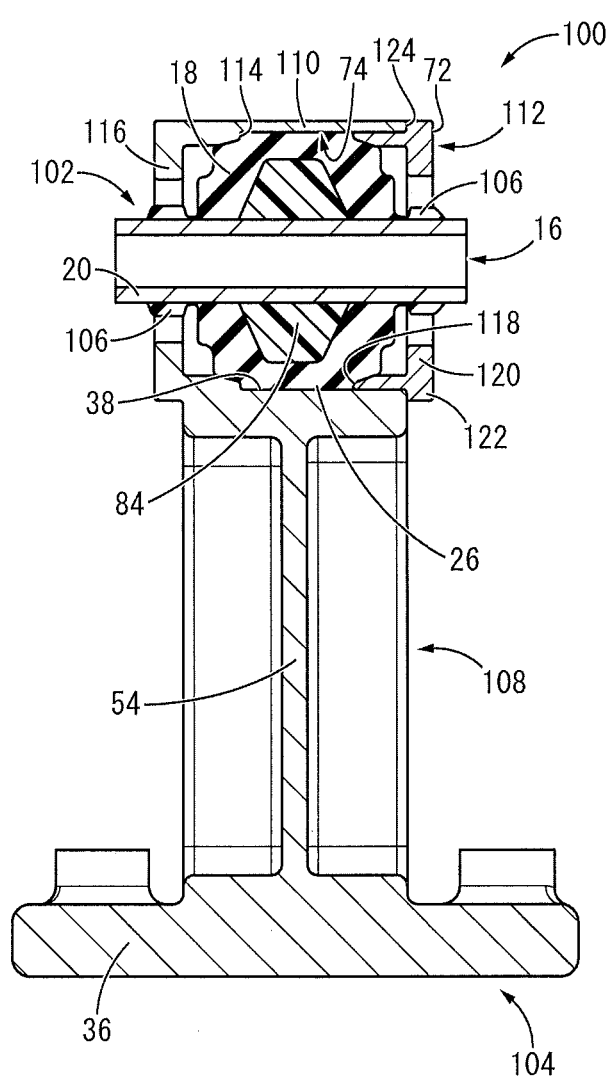
FIG. 14 is a longitudinal cross-sectional view of an engine mount as a third embodiment of this invention.

In FIG. 14, an automotive engine mount 100 is shown as the third embodiment this invention. The engine mount 100 is given a structure wherein an outer bracket 104 is attached to a mount body 102 as the vibration damping device main unit.

In more detail, the mount body 102 has a structure wherein the vibration damping rubber 18 is adhered through vulcanized adhesion to the outer peripheral surface of the inner shaft member 16. Furthermore, the stopper member 84 protruding vertically is attached to the inner shaft member 16. The stopper member 84 is a rigid member formed of synthetic resin, etc., and is installed inside the vibration damping rubber 18. A pair of shock absorbing rubbers 106 that protrude vertically is also attached to the outer peripheral surface of the inner shaft member 16. These shock absorbing rubbers 106 are integrally formed with the vibration damping rubber 18 and are located at both sides of the vibration damping rubber 18 in the axial direction.

On the other hand, the outer bracket 104 is a highly rigid member formed of metal or aluminum alloy, etc., and has a structure wherein a press-fit member 112 is press fit into a peripheral wall 110 of a bracket body 108.

A step 114 is formed on the inner peripheral surface of the peripheral wall 110 and, while the inner dimension in the axis-perpendicular direction is made smaller on one side of the axial direction (left side of FIG. 14) than on the other side. Also, on the axial one end of the peripheral wall 110, a primary inner projection 116 which protrudes vertically inward is integrally formed.

The press-fit member 112 is an annular-shaped member that, while its one axial side (the tip end in the direction of press fitting) can be press-fit into the other axial side of the peripheral wall 110, a tapered thick contact surface 118 that flares toward the direction of press fitting is formed on one axial end. A secondary inner projection 120 that protrudes vertically inward is integrally formed on the other axial side of the press-fit member 112 (the tail end in the direction of press fitting), and an outer projection 122 that protrudes from the outer peripheral surface are also integrally formed.

The engine mount 100 is formed by inserting the mount body 102 into the peripheral wall 110 of the bracket body 108 from the other axial end and press fitting the press-fit member 112 into the other axial end of the peripheral wall 110. With this embodiment, the positioning section that determines the position of the end of the press-fit member 112 with respect to the bracket body 108 is composed through the mutual contact of the axially opposing surfaces of the outer projection 122 of the press-fit member 112 and an open end surface 124 of the peripheral wall 110.

The outer peripheral end of the vibration damping rubber 18 on the mount body 102 is compressed in the axial direction between the surface of the step 114, which is formed on the inner peripheral surface of the peripheral wall 110 of the bracket body 108, and the thick contact surface 118 of the press-fit member 112.

The primary inner projection 116 is provided protruding at one end of the axial direction of the mounting hole 74 of the outer bracket 104 and the secondary inner projection 120 is provided protruding at the other end of the axial direction. The vibration damping rubber 18 of the mount body 102 is positioned axially between these primary and secondary inner projections, 116 and 120. With this embodiment, the primary and secondary inner projections, 116 and 120, are overall respectively located on the axially outer side away from the vibration damping rubber 18, and serve as non-constraining parts that give both axial end surfaces of the vibration damping rubber 18 a free surface. This way, bulging deformation outward in that axial direction of the vibration damping rubber 18 is allowed, and the tuning of the spring characteristics of the vibration damping rubber 18 can be softened.

Furthermore, the protruding tip surfaces of the primary and secondary inner projections, 116 and 120, are arranged in opposition to the respective shock absorbing rubbers 106 and separated by a designated distance to the outer circumference side. The stopper mechanism in the axis-perpendicular direction, which limits the amount of relative displacement between the inner shaft member 16 and the outer bracket 104 in the axis-perpendicular direction, is provided through the contact of the primary and secondary inner projections, 116 and 120, with the outer peripheral surface of the inner shaft member 16 through the shock absorbing rubbers 106. Through this, it is possible to limit the amount of relative displacement between the power unit (not illustrated) and the vehicle's body (not illustrated) in the axis-perpendicular direction of the inner shaft member 16.

Furthermore, the primary and secondary inner projections, 116 and 120, overlap in their axial projection with the rigid stopper member 84 that is fixed to the inner shaft member 16, and are situated on the respective axial sides sandwiching the stopper member 84. The stopper mechanism in the axial direction that limits the amount of relative displacement between the inner shaft member 16 and the outer bracket 104 in the axial direction is provided by the contact of the primary and secondary inner projections, 116 and 120, with the stopper member 84 in the axial direction. By providing that stopper mechanism in the axial direction, the mount body 102 is prevented from falling out of the mounting hole 74 of the outer bracket 104 when there is input in the axial direction, and the state of installation for the mount body 102 and the outer bracket 104 is stably maintained. And, by press fitting the press-fit member 112 into the other end of the axial direction of the inner hole 38 after inserting the mount body 102 into the inner hole 38 of the bracket body 108, it is possible to insert the rigid stopper member 84 axially between the primary and secondary inner projections, 116 and 120, in the mounting hole 74.

Embodiments of this invention are described in detail above, but this invention is not limited to those concrete descriptions. For example, the bracket body 30 and the press-fit member 32 may be made of mutually different materials. Concretely, for example, the outer bracket 14 can be composed by press fitting the press-fit member 32 that is formed of metal or a fiber-reinforced synthetic resin into the bracket body 30 that is formed of an aluminum alloy.

The positioning section may also be composed with the press-fit tip surface 68 of the press-fit member contacting the stepped surface 48 of the bracket body in the axial direction, and the outer projection 122 provided on the press-fit member contacting the open end surface 124 of the bracket body in the axial direction. In short, the axially opposing surfaces that compose the positioning section do not necessarily need to be limited only to a single set; the positioning section can be composed of multiple sets of axially opposing surfaces.

Also, the structure of attaching the bracket body 30 onto the vehicle (the attachment 36 and the connecting member 54), does not particularly have to be limited to that exemplified. For example, it can be changed as appropriate according to the position of attachment on the vehicle and the structure of attachment to the vehicle body etc. In the same way, the concrete shape of the inner shaft member 16 is not particularly limited, and it can be changed as appropriate according to the structure of attachment to the power unit or the stopper structure, etc.

The cylindrical vibration-damping device equipped with outer bracket and the outer bracket related to this invention are not limited to automobiles and may also be applied to, for example, motorcycles, rolling stock for railways, industrial vehicles, etc. Furthermore, the scope of this invention is not limited to an engine mount and it may also be suitably applied, for example, to a subframe mount, a body mount, a differential mount, etc.

EXPLANATION OF NUMERALS 10, 80, 90, 100: engine mount (cylindrical vibration-damping device equipped with outer bracket)
12, 82, 102: mount body (vibration damping device main unit)
14, 92, 104: outer bracket
16: inner shaft member
18: vibration damping rubber
30, 108: bracket body
32, 94, 112: press-fit member
34, 110: peripheral wall
40, 116: primary inner projection
48: stepped surface
58, 96, 120: secondary inner projection
64, 118: thick contact surface
68: press-fit tip surface
70: extending inner surface
74: mounting hole
122: outer projection
124: open end surface

What is claimed is:

1. A cylindrical vibration-damping device equipped with an outer bracket comprising:
   a vibration damping device main unit wherein a vibration damping rubber is provided on an outer circumference of an inner shaft member; and
   the outer bracket having a mounting hole into which the vibration damping rubber of the vibration damping device main unit is installed,
   wherein the outer bracket includes:
   a bracket body having a peripheral wall that forms the mounting hole and a primary inner projection provided at one end in an axial direction of the peripheral wall;
   a press-fit member that is press fit into another end of the peripheral wall of the bracket body in the axial direction and that forms a secondary inner projection;
   a positioning section that is composed of axially opposing surfaces of the bracket body and the press-fit member and that determines a position of an end of the press-fit member through mutual contact of the opposing surfaces; and
   a thick contact surface that is formed on a tip end of the press-fit member in a direction of press fitting by having the press-fit member made as a thick-walled molded part and that comes into contact with the vibration damping rubber in the axial direction,
   the press-fit member being an aluminum die cast molded component.

2. The cylindrical vibration-damping device according to claim 1, wherein
   the axially opposing surfaces of the positioning section are composed of a stepped surface provided on an inner peripheral surface of the mounting hole of the bracket body and a press-fit tip surface that is formed on a tip portion of the press-fit member in the direction of press fitting and that comes into contact with the stepped surface of the bracket body.

3. The cylindrical vibration-damping device according to claim 2, wherein
   a tip end portion of the press-fit member in the direction of press fitting is given substantially a same thickness as the stepped surface, and an extending inner surface that is contiguous to the tip end portion is formed on the press-fit member towards the tip end in the direction of press fitting from the secondary inner projection.

4. The cylindrical vibration-damping device according to claim 1, wherein
   an outer projection is provided protruding from an outer peripheral surface of the press-fit member at a tail end in the direction of press fitting, and the positioning section is composed of the axially opposing surfaces of the outer projection of the press-fit member and an open end surface at the open end of the mounting hole of the bracket body.

5. The cylindrical vibration-damping device according to claim 1, wherein
   the primary inner projection and the secondary inner projection are pressed against both axial end surfaces of an outer circumference of the vibration damping rubber and compose an axial compressing surface that exerts pre-compression on the vibration damping rubber.

6. The cylindrical vibration-damping device according to claim 1, wherein
the primary inner projection and the secondary inner projection are respectively arranged a designated distance away from both axial end surfaces of the vibration damping rubber at least at an inner circumferential portion thereof, and are equipped with a non-constraining part that gives a free surface.

7. The cylindrical vibration-damping device according to claim 1, wherein
the secondary inner projection and the inner shaft member are arranged in opposition and separated by a designated distance in an axis-perpendicular direction, and a stopper mechanism in the axis-perpendicular direction is provided through contact between the secondary inner projection and the inner shaft member.

8. A cylindrical vibration-damping device equipped with an outer bracket comprising:
a vibration damping device main unit wherein a vibration damping rubber is provided on an outer circumference of an inner shaft member; and
the outer bracket having a mounting hole into which the vibration damping rubber of the vibration damping device main unit is installed,
wherein the outer bracket includes:
a bracket body having a peripheral wall that forms the mounting hole and a primary inner projection provided at one end in an axial direction of the peripheral wall;
a press-fit member that is press fit into another end of the peripheral wall of the bracket body in the axial direction and that forms a secondary inner projection;
a positioning section that is composed of axially opposing surfaces of the bracket body and the press-fit member and that determines a position of an end of the press-fit member through mutual contact of the opposing surfaces; and
a thick contact surface that is formed on a tip end of the press-fit member in a direction of press fitting by having the press-fit member made as a thick-walled molded part and that comes into contact with the vibration damping rubber in the axial direction,
the press-fit member being an extrusion molded component made of aluminum.

9. The cylindrical vibration-damping device according to claim 8, wherein
the axially opposing surfaces of the positioning section are composed of a stepped surface provided on an inner peripheral surface of the mounting hole of the bracket body and a press-fit tip surface that is formed on a tip portion of the press-fit member in the direction of press fitting and that comes into contact with the stepped surface of the bracket body.

10. The cylindrical vibration-damping device according to claim 9, wherein
a tip end portion of the press-fit member in the direction of press fitting is given substantially a same thickness as the stepped surface, and an extending inner surface that is contiguous to the tip end portion is formed on the press-fit member towards the tip end in the direction of press fitting from the secondary inner projection.

11. The cylindrical vibration-damping device according to claim 8, wherein
an outer projection is provided protruding from an outer peripheral surface of the press-fit member at a tail end in the direction of press fitting, and the positioning section is composed of the axially opposing surfaces of the outer projection of the press-fit member and an open end surface at the open end of the mounting hole of the bracket body.

12. The cylindrical vibration-damping device according to claim 8, wherein
the primary inner projection and the secondary inner projection are pressed against both axial end surfaces of an outer circumference of the vibration damping rubber and compose an axial compressing surface that exerts pre-compression on the vibration damping rubber.

13. The cylindrical vibration-damping device according to claim 8, wherein
the primary inner projection and the secondary inner projection are respectively arranged a designated distance away from both axial end surfaces of the vibration damping rubber at least at an inner circumferential portion thereof, and are equipped with a non-constraining part that gives a free surface.

14. The cylindrical vibration-damping device according to claim 8, wherein
the secondary inner projection and the inner shaft member are arranged in opposition and separated by a designated distance in an axis-perpendicular direction, and a stopper mechanism in the axis-perpendicular direction is provided through contact between the secondary inner projection and the inner shaft member.

* * * * *